Figure 1:
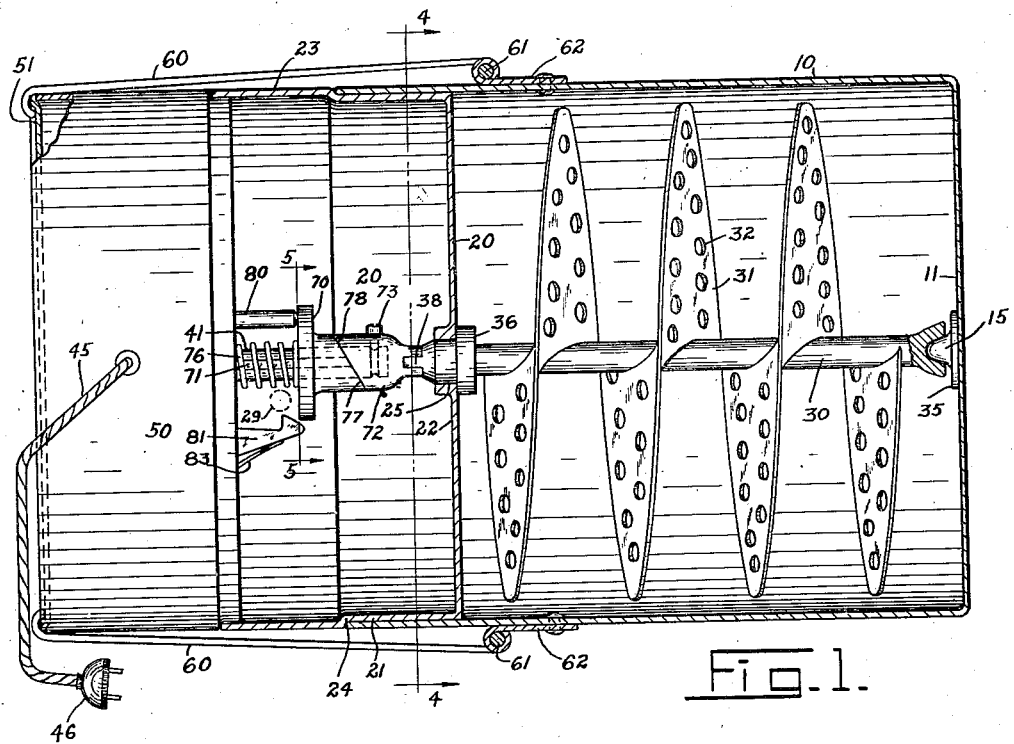

June 24, 1930.  W. A. HILES  1,766,172

ICE CREAM FREEZER

Filed Jan. 15, 1930   2 Sheets-Sheet 1

Inventor
William A. Hiles
By Bates, Goldrick & Fears
Attorneys.

June 24, 1930.  W. A. HILES  1,766,172
ICE CREAM FREEZER
Filed Jan. 15, 1930   2 Sheets-Sheet 2

Inventor
William A. Hiles,
By Bates Goldrick & Fearn,
Attorneys.

Patented June 24, 1930

1,766,172

UNITED STATES PATENT OFFICE

WILLIAM A. HILES, OF CLEVELAND, OHIO

ICE-CREAM FREEZER

Application filed January 15, 1930. Serial No. 420,866.

This invention relates to an ice cream freezer adapted for mounting in an iceless refrigerator, adjacent the cooling coils thereof by which the contents of the freezer may be sufficiently frozen to make ice cream, sherbets, etc. My freezer is power driven, preferably by means of an electric motor.

One of the objects of the invention is to provide such freezer and its driving motor in such form that the different parts may be readily assembled outside of the refrigerator and the whole device mounted as a unit in a proper compartment of the refrigerator. Thus the material receptacle may be readily charged with the liquid to be frozen and the driving motor readily attached to the stirring device in the receptacle.

Another feature of the invention relates to provision for maintaining a substantially liquid tight closure for the material receptacle so that the receptacle may be placed on its side in the refrigerator without substantial leakage. I provide however, means whereby any leakage of such material which does take place, is prevented from passing to the driving motor; likewise any leakage of oil from the driving motor cannot pass to the receptacle.

Another feature of the invention is the provision of a suitable automatic switch disconnecting the driving power when the material has been solidified to a predetermined degree. As the driving motor is preferably an electric motor, this automatic switch operates to open the circuit to the motor.

The above mentioned features and others contributing to the efficiency of my device will be rendered more apparent from the following detailed description of a preferred embodiment of the invention illustrated in the drawings hereof.

Figures 2, 3:
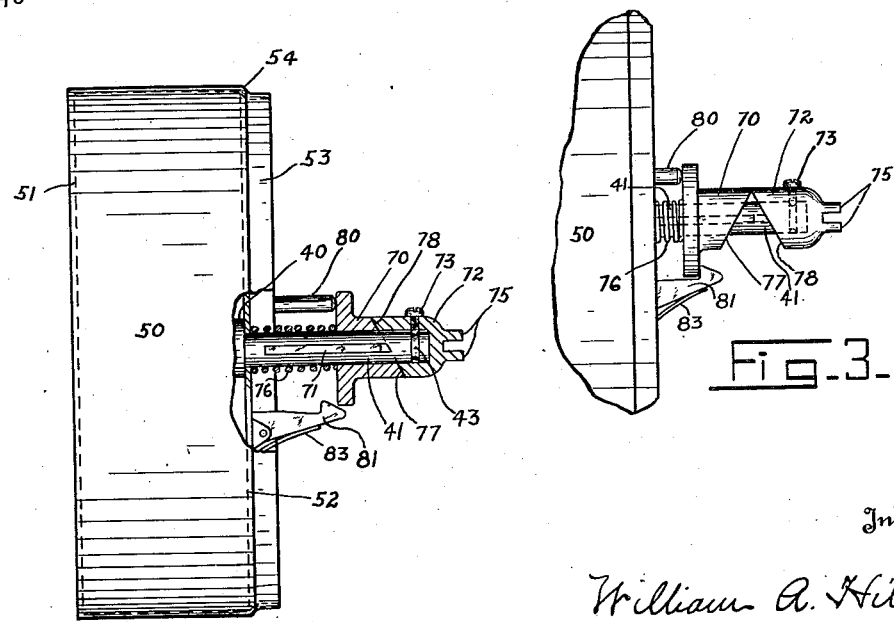
Figure 6:
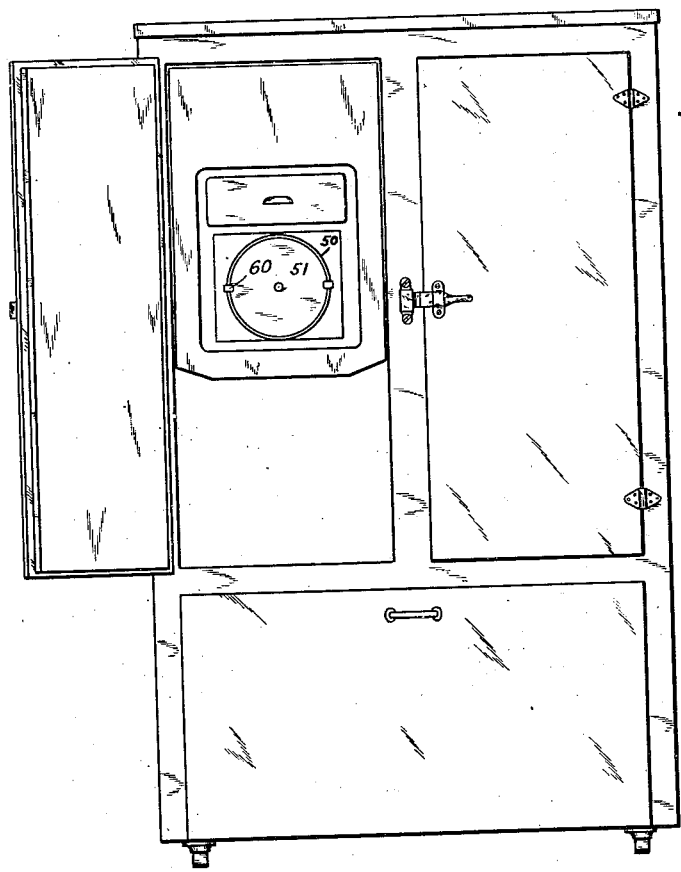
Figure 7:
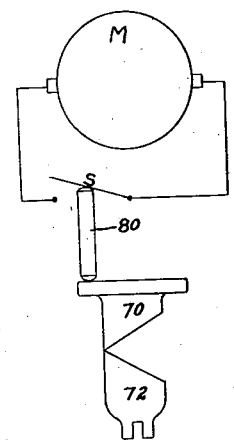
Figure 5:
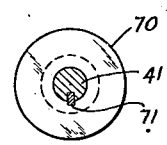
Figure 4:
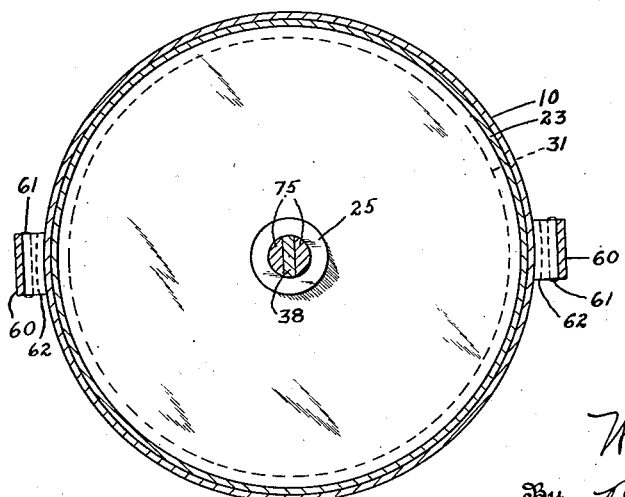

In the drawings, Fig. 1 is a horizontal section through my freezer, in the position it occupies in the refrigerator; Fig. 2 is a side elevation partly sectional of the motor compartment detached; Fig. 3 is a fragmentary side elevation of parts shown in Fig. 1, but with the driving clutch in position to open the switch controlling the motor circuit; Figs. 4 and 5 are cross sections on correspondingly numbered lines on Fig. 1; Fig. 6 is a front elevation of an iceless refrigerator with the door to the freezing compartment open, showing my freezer in place; Fig. 7 is a diagram illustrating the action of the clutch in opening the switch.

As shown in Fig. 1, 10 indicates a suitable cylindrical can adapted to contain the material to be frozen. To close this can, I provide a suitable cup 20 which fits snugly within the entrance end of the can; that is to say, the cup has a cylindrical wall 21 making a close sliding fit with the interior of the can and a circular base 22 adapted to extend across the interior of the can. A zone 23 of the cup, adjacent its outer end, is of larger diameter, substantially aligning with the wall of the can 10, and thus providing a shoulder 24 limiting the innermost position of the cup.

The base 22 of the cup and the base 11 of the can 10 have means for holding the rotary stirrer. This stirrer is shown as consisting of a shaft 30 carrying a continuous helical blade 31 having suitable openings 32 through it. Near its lower end (when the freezer is upright) the shaft 30 has an enlargement 35 with a central conical cavity which rests on a conical projection 15 carried by the base 11 of the can. Near the other end the shaft 30 extends through a central opening in a boss 25 on the cup base 22. The shaft preferably has a suitable collar 36 adapted to bear against the inner side of the cup base.

In charging the freezer, the can is stood upright and material put into it to the desired height; then the stirrer is put in place with its bottom on the bearing 15; then the cover is slid into the can with the opening in the boss 25 passing over the projecting shaft 30, the end portion of the latter being tapered to allow ease of installation. The extreme end of the shaft is cut away to provide a transverse rib 38 by which the shaft may be driven, as hereinafter explained.

The motor is of any suitable type, and is not specifically shown, but is indicated at M in Fig. 7. This motor is contained within a closed box having a cylindrical wall 50, a top plate 51, and a base plate 52. Beyond this base plate, the wall 50 has a skirt 53 of reduced diameter, which may slide snugly within the wall 23 of the intermediate cup 20, the shoulder 54 abutting the end of the wall 23. When in this position, the motor casing, the intermediate cup, and the material can are all locked together by suitable means; the means shown comprising two hooks 60 which are hinged at 61 to a pair of straps 62 riveted to opposite sides of the can 10.

The casing 50 has an internal axial bearing 40 from which projects a shaft 41 driven by the motor. Suitable reduction gearing (not shown) may be employed between the armature and the driven shaft 41, or the shaft 41 may itself be the armature shaft, if desired. This shaft 41 aligns with the stirrer shaft 30. To couple them together, I provide the clutch shown in Figs. 1, 2 and 3, comprising the slidable collar 70 splined on the shaft 41 by a feather 71, and the collar 72 which is freely rotatable on the shaft, but is not longitudinally movable thereon, being shown retained in this condition by a set screw 73 engaging a groove 43 in the armature shaft. The collar 72 has a pair of projecting wings 75 adapted to embrace the rib 38 of the stirrer shaft. A helical spring 76 surrounds the shaft 41 and is compressed between the base plate 52 of the casing and the slidable collar 70. The two collars have their proximate ends formed on complementary inclines 77 and 78, these inclined surfaces being normally maintained in contact as shown in Figs. 1 and 2.

When the loaded freezer is first installed and the motor energized, by the connection of a suitable plug or by the turning on of a switch, not shown, the motor rotates and through the clutch turns the stirrer. The spring 76 is of sufficient force to maintain the inclined faces 77, 78 in complementary contact until the contents of the can becomes materially solidified. As solidification continues, the collar 71 is more and more cammed back by the incline 78, but still the driving continues until the contents of the can has reached the desired degree of solidity. Then the resistance presented by such contents overcomes the spring 76, and the collar 70 is cammed back substantially the full distance into the position shown in Fig. 3, and, as it comes into this position, it operates a suitable switch to disconnect the power.

The automatic switch is not specifically shown, but its operation is indicated in Fig. 7, where M designates the motor and S the switch. The switch contacts are within the motor casing 50 and the movable contact is actuated by a sliding pin 80 projecting through the base 52 of the motor container. This pin is normally pressed outwardly by a spring, not shown, and bears against the collar 70. When the collar has forced the pin inward to its extreme position, as shown in Fig. 3, the pin throws the switch to open the circuit to the motor, thereby stopping the operation. To hold the collar in this position, I may provide a suitable latch 81 pivoted on the exterior of the base 52 and pressed by a spring 83 toward the collar.

In using the freezer, after the material is put into the can, the stirrer installed and the cover put into the can, the latch 83 is pulled back to release the collar 70 and then the motor casing is put into place and the parts locked together by the hooks 60; then the complete unit is placed in the refrigerator and the double conductor 45 leading from the motor out of the container 50 is suitably connected with electric terminals. It is convenient to have this double conductor terminate in a plug, indicated at 46, which may engage a suitable socket carried within the refrigerator. As soon as the plug is placed in the socket, the motor starts operating and continues to drive the stirrer until the material in the can has so congealed that the sliding clutch member is cammed back to open the switch within the motor compartment, then the motor operation ceases. Thereafter, the disconnection of the plug 46 and the removal of the unit allows the removal of the motor casing and the cup cover, thus giving access to the frozen contents of the can.

I desire to call particular attention to the space between the food compartment and the motor compartment of my complete machine, this space being provided by the cup-like cover 20. This intermediate compartment not only forms a container for the clutch, but provides a draining space for any leakage of food material about the stirrer shaft 30, or oil about the motor driven shaft 41. In either case, such liquid passes to the interior of the cup 20, and if desired, may be drained through a suitable opening indicated at 29 and a wall 23. However, such leakage ordinarily would be of such small quantity that it may be left in the cup, and when the device is stood upright will stand on the base 22 but not rise above the boss 25.

It will be noticed that the stirrer is not of the paddle form usual in ice cream freezers, but is formed of a continuous helical blade with openings through it. Such stirrer may rotate much faster than the ordinary paddle and operates to force material lengthwise of the can while allowing a portion of such material to move back longitudinally through the openings, thus obtaining a circulation of the material.

I claim:

1. An ice cream freezer adapted for mounting horizontally in an iceless refrigerator and comprising a closed horizontal compartment for the material to be frozen, a motor compartment, and a leakage compartment between them, a stirrer in the material compartment, and a coupling in the leakage compartment between the motor and stirrer.

2. In an ice cream freezer, the combination of a closed compartment for the material to be frozen, a stirrer in said compartment having a shaft extending beyond the compartment, a compartment containing a motor, a shaft driven by the motor and extending beyond its compartment, an intermediate compartment, a coupling between the motor driven shaft and stirrer shaft in the intermediate compartment, all three compartments being separable from each other, and mechanism for holding the three compartments in alignment.

3. In an ice cream freezer, the combination of a can adapted for material to be frozen, a closure therefor, a motor, a casing therefor, a stirrer within the material compartment having one bearing on the base of said compartment and another in the closure extending through the latter, a driving connection between the motor and the stirrer, and hooks adapted to connect the motor casing with the material can and thereby hold the parts together.

4. In an ice cream freezer, the combination of a can adapted for material to be frozen, a rotary stirrer within said can, a cup-like cover for the can adapted to seat within it, making a substantially liquid tight connection with the inner wall of the can and having a bearing for the stirrer shaft, a casing containing a motor and a projecting shaft driven thereby, means for holding a motor casing on the cup-like cover of the can, and a connection between the motor driven shaft and the stirrer shaft.

5. In an ice cream freezer, the combination of a can adapted for material to be frozen, a cup-like closure therefor adapted to seat within said can, a motor, a casing therefor adapted to seat against the end of the cup-like closure, a stirrer within the material compartment having one bearing on the base of said compartment and another in the base of the cup-like closure and extending through the latter base, and a coupling between the motor driven shaft and the stirrer shaft located in the intermediate space between their respective compartments.

6. The combination of a can having a base and a cylindrical wall, a cup-like closure adapted to seat within the open end of the can and provide a partition across it, a casing for a motor having a skirt adapted to engage the wall of the cup-like closure, means for holding the three compartments together, a stirrer in the material compartment, a motor in the motor compartment, a shaft driven by the motor and extending into the intermediate compartment, a shaft for driving the stirrer and extending into the intermediate compartment, and a coupling in the intermediate compartment connecting the two shafts.

7. In an ice cream freezer, the combination of a compartment for the material to be frozen, a stirrer in said compartment having a shaft extending beyond the compartment, a motor, a clutch connecting the motor and stirrer, and a spring tending to maintain the clutch engaged whereby the clutch may lose its driving power when the congelation of the material provides an undue resistance to the rotation of the stirrer.

8. In an ice cream freezer, the combination of a container for the material, a stirrer therein, a driving motor operating a shaft aligned with the stirrer shaft, a clutch connecting said two shafts and comprising two members, one rotatable but not longitudinally shiftable and the other longitudinally shiftable but not rotatable independently of its shaft, said members having mutually engageable faces, and a spring tending to maintain the faces in contact.

9. In an ice cream freezer, the combination of a motor, a shaft driven thereby, a collar splined on the shaft having an inclined face, the collar freely rotatable and having a complementary inclined face, a spring pressing the splined collar against the rotatable collar, a compartment for the material to be frozen, a stirrer in said compartment, and means for joining the stirrer shaft with the freely rotatable collar.

10. In an ice cream freezer, the combination of a receptacle for material to be frozen, a stirrer therein, a motor, a separable coupling between the motor and stirrer, and a switch for the motor operated by the separation of said coupling.

11. In an ice cream freezer, the combination of a container for the material to be frozen, a stirrer therein, a motor driving a shaft aligned with the stirrer shaft, a clutch connecting the motor with the stirrer and including a driving collar adapted to be cammed backwardly when the stirrer presents undue resistance, and means whereby such backward camming of the collar stops the motor.

12. In an ice cream freezer adapted for mounting in an iceless refrigerator, the combination of a can adapted to contain material to be frozen, a stirrer in said can comprising a shaft with a continuous helical blade about it, there being openings through said helical blade whereby the rotation of the shaft may cause the material to circulate longitudinally in the can, an electric motor for rotating said shaft and an electric switch for disconnecting said motor when the congelation of the material presents a maximum desired resistance to the rotation of the stirrer.

13. In an ice cream freezer, the combination of a closed compartment for the material to be frozen, a stirrer in said compartment having a shaft extending beyond the compartment, a closed compartment containing driving mechanism having a projecting driven shaft, there being a closed compartment containing driving mechanism having a projecting driven shaft, there being an intermediate compartment, a coupling between said driven shaft and stirrer shaft in the intermediate compartment, all three compartments being separable from each other.

14. In an ice cream freezer, the combination of a can adapted for material to be frozen, a cup-like closure therefor adapted to seat within said can, driving mechanism, a casing therefor adapted to seat within the cup-like closure, a stirrer within the material compartment having a shaft extending into the cup-like closure, and a coupling between the driving mechanism and the stirrer shaft located in the intermediate space between their respective compartments.

15. In an ice cream freezer, the combination of a can adapted for material to be frozen, a rotary stirrer within said can, a cup-like cover for the can adapted to seat within it, and having a central shaft bearing, an electric motor, a projecting shaft driven thereby in alignment with said bearing, and a connection between the motor driven shaft and the stirrer.

16. The combination with an iceless refrigerator having a horizontal compartment with a door, an ice cream freezer adapted for mounting horizontally in such compartment and comprising a cylindrical can for the material to be frozen, an electric motor in its own casing, a central shaft driven by the motor, a stirrer in the material can and a coupling in a leakage compartment between the motor and stirrer.

In testimony whereof, I hereunto affix my signature.

WILLIAM A. HILES.